United States Patent [19]

Fang et al.

[11] Patent Number: 4,994,637

[45] Date of Patent: Feb. 19, 1991

[54] INDUCTION COIL WITH LAPPED JOINT

[75] Inventors: Jin-Liou Fang; J. Kirkwood H. Rough, both of San Jose, Calif.

[73] Assignee: FMC Corporation, Chicago, Ill.

[21] Appl. No.: 429,688

[22] Filed: Oct. 30, 1989

[51] Int. Cl.$^5$ .............................................. H05B 6/40
[52] U.S. Cl. ............................. 219/10.53; 219/10.73; 219/10.79; 156/272.4; 156/380.2
[58] Field of Search ............... 219/10.57, 10.79, 10.73, 219/10.43, 10.491; 156/69, 272.2, 272.4, 273.9, 274.2, 275.7, 379.6, 379.7, 380.2, 380.6; 336/223, 232

[56] References Cited

U.S. PATENT DOCUMENTS

| | | | |
|---|---|---|---|
| 2,515,874 | 7/1950 | Hoyler et al. | 219/10.79 |
| 3,808,074 | 4/1974 | Smith et al. | 156/273.7 |
| 4,571,472 | 2/1986 | Pollack et al. | 219/10.53 |
| 4,749,837 | 6/1988 | von Ammon et al. | 219/10.79 |
| 4,757,175 | 7/1988 | Mohr et al. | 219/10.79 |
| 4,833,287 | 5/1989 | Abe et al. | 219/10.79 |

*Primary Examiner*—Philip H. Leung
*Attorney, Agent, or Firm*—Lloyd B. Guernsey; R. C. Kamp; R. B. Megley

[57] ABSTRACT

A single turn induction coil which provides uniform sealing of lids to plastic containers. A first end of the coil overlaps a second end of the coil with the ends being tapered to form a single complete ring. An electrical current is coupled to the overlapped portions of the first and second end of the coil so the electrical current flows for more than 360° around the coil. This provides an induced electrical current around a container lid adjacent to the coil and provides heating of the complete circumference of the lid. A variety of shapes of containers and matching lids can be used with the present invention.

7 Claims, 2 Drawing Sheets

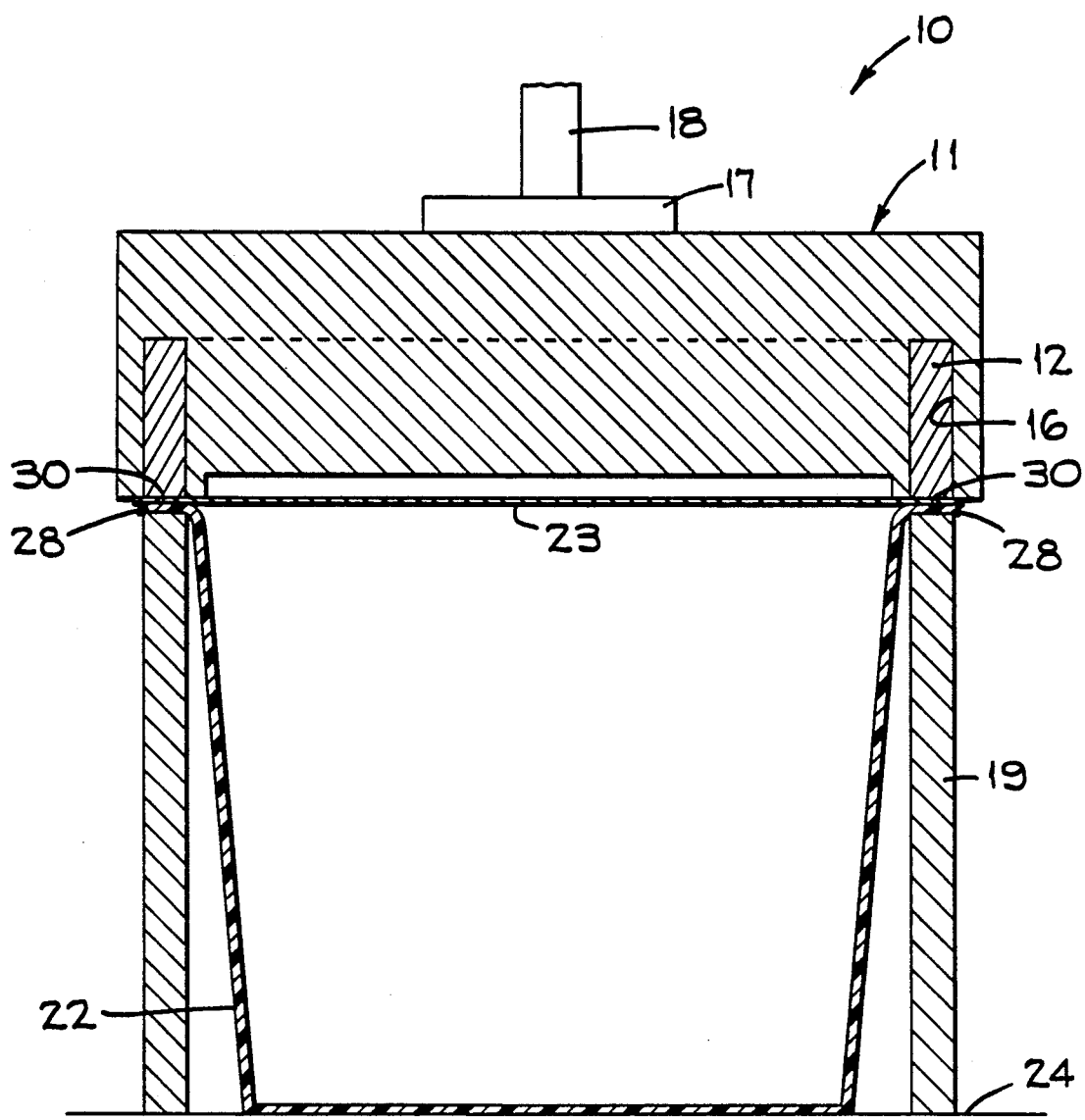
FIG_1

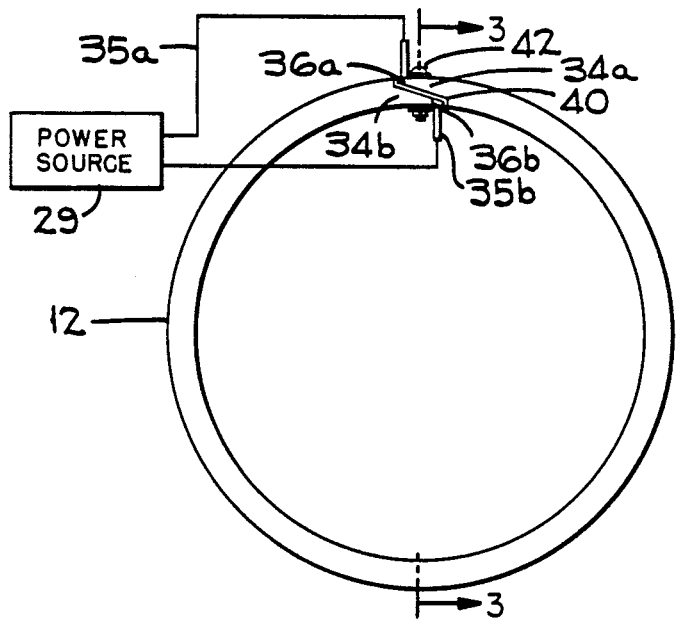
FIG_2
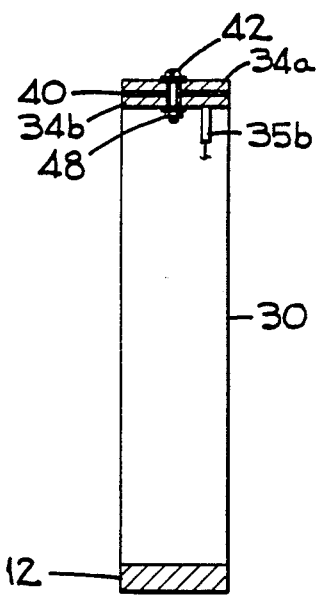
FIG_3
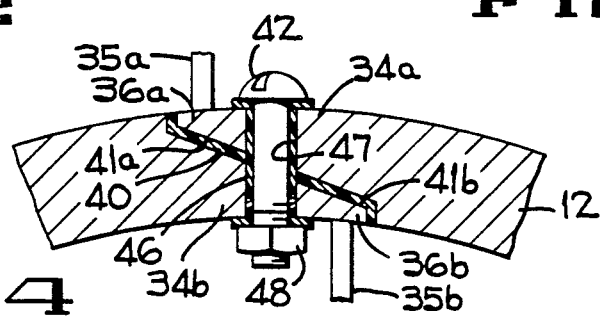
FIG_4
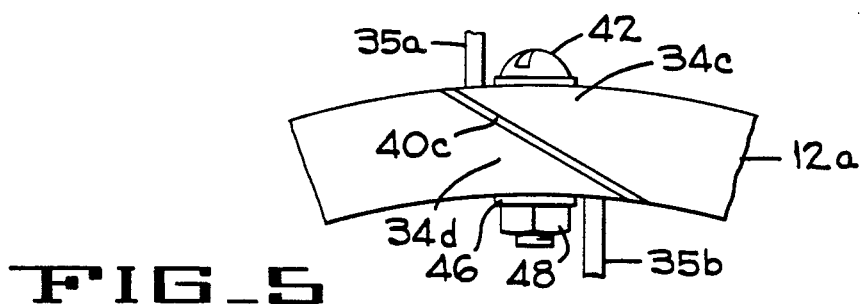
FIG_5
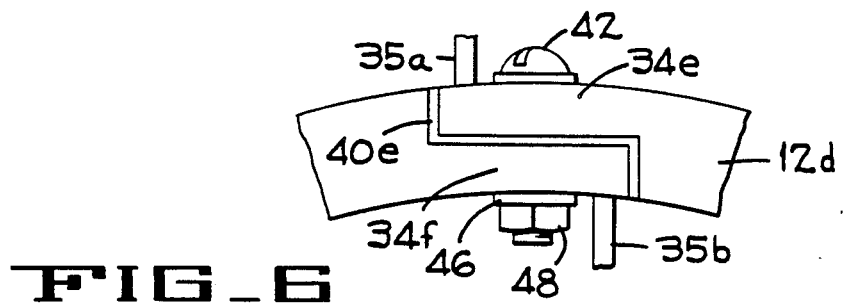
FIG_6

INDUCTION COIL WITH LAPPED JOINT

BACKGROUND OF THE INVENTION

The present invention relates to induction heating coils, and more particularly, to a single turn coil which provides heating for uniform sealing of lids to food containers around a complete circumference of the containers.

Plastic containers are commonly used for the packaging of food and for a wide variety of other items wherein a plastic lid is bonded to the container by the application of heat. One method of bonding involves the use of a laminated plastic lid having a layer of metal foil. A power supply provides an electrical current to a nearby induction coil which induces an electrical current into the metal foil to develop heat which melts portions of the lid and container and fuses the lid to the container. Multiple turn induction coils are rather bulky and difficult to mount in position to press the lid against the container during the sealing operation. Single turn coils are more convenient for pressing against the lid but have a small gap between the ends which causes a poor seal in an adjacent portion of the lid.

SUMMARY OF THE INVENTION

The present invention discloses an induction heating system using a single turn coil which provides uniform sealing of lids to containers around the complete circumference of the containers. A first end of the coil overlaps a second end of the coil with the ends being tapered to form a single complete ring. An electrical current is coupled from a source of electrical power to an overlapped portion of the first and second coil ends so an electrical current flows for more than 360° around the coil. The coil current induces a current in a container lid adjacent to the coil and heat is developed in the lid from the induced current. Heat is then transferred from the lid to an adjacent flange portion of the container When a bottom portion of the lid and an upper portion of the container flange reach the melting point, the lid and container fuse together with the help of pressure from the induction coil.

BRIEF DESCRIPTION OF THE DRAWINGS

FIG. 1 is a cross section of an induction heating system with a container and lid using a single turn coil of the present invention.

FIG. 2 is a plan view of a single turn coil of the present invention with a source of electrical power attached to the coil.

FIG. 3 is a sectional view taking along line 3—3 of FIG. 2.

FIG. 4 is an enlarged cross section of a portion of the ring of FIG. 2.

FIGS. 5 and 6 are alternate embodiments of the single turn coil of FIGS. 1-3 showing different types of overlapping ends of the coil.

DESCRIPTION OF THE PREFERRED EMBODIMENT

A container sealing system 10 in which the present invention can be used is shown in FIG. 1. System 10 includes a coil assembly 11 having a single turn coil 12 mounted in a groove 16. A plate 17 and a rod 18 attached between assembly 11 and a source of mechanical pressure (not shown) provide vertical movement of assembly 11. A plastic container 22 having a laminated plastic and foil lid 23 is mounted in a base 19 which is supported by a platform 24. In a high production sealing system platform 24 can be a having conveyor belt which transports containers in a single file into position under coil assembly 11.

When lid 23 is to be sealed to container 22, coil assembly 11 is raised by rod 18 so container 22 and lid 23 can be moved into position (FIG. 1) directly under assembly 11. Assembly 11 is lowered until coil 12 presses lid 23 firmly against an upper lip 28 of container 22. An electrical current from source 29 (FIG. 2) is applied to coil 12 causing an induced current to flow in lid 23. The induced current provides heat which melts a portion of lip 28 and of the adjacent portion of lid 23 to fuse lid 23 to lip 28. The electrical current to coil 12 is terminated and coil 12 briefly remains against lid 23 while lip 28 and lid 23 cool to form a permanent seal. Assembly 11 is then raised so container 22 can be removed and another container and lid moved into position for sealing. Single turn coil 12 includes a smooth lower edge 30 (FIGS. 1, 3) which presses lid 23 securely against container lip 28 along the full circumference of lip 28 to provide uniform sealing of lid 23 to container 22.

Coil 12 includes a pair of tapered overlapping ends 34a, 34b (FIGS. 2, 4) with a first power output lead 35a from power source 29 connected to an extreme end portion 36a, and a second power output lead 35b connected to an extreme end portion 36b. Electrical current from output lead 35a flows more than 360° through coil 12 to output lead 35b. Tapered end 34a overlaps tapered end 34b by several degrees, even though the thickness of ring 12 remains constant. The overlapped ends insure that an electrical current in the ring 12 induces a current in lid 23 which heats lid 23 (FIG. 1) and the upper lip 28 to insure a complete seal between the container and the lid. An insulator 40 is mounted between a tapered surface 41a of end 34a and a matching tapered surface 41b of end 34b. A bolt 42 and an insulating sleeve 46 are mounted in a hole 47 to secure surfaces 41a, 41b against insulator 40. When nut 48 and bolt 42 are formed from an insulating material, sleeve 46 can be omitted from the apparatus.

FIG. 5 discloses another embodiment of a single turn coil 12a with a slightly different shape of tapered ends 34c, 34d and of insulator 40c. Bolt 42 and nut 48 can be made of an insulating material or an insulating sleeve 46 can be used as shown in FIG. 4.

FIG. 6 discloses a third embodiment of a single turn coil 12d with another shape of ends 34e, 34f and of insulator 40e.

A single turn coil of the present invention has overlapping ends with electrical power applied to end portions so an electrical current flows for more than 360° around the coil to provide uniform heating of a container and container lid adjacent to the coil.

Although the best mode contemplated for carrying out the present invention has been herein shown and described, it will be apparent that modification and variation may be made without departing from what is regarded to be the subject matter of the invention.

What is claimed is:

1. An induction heating system for providing uniform heat around a complete circumference of a plastic food container to achieve uniform sealing of a lid to the food container wherein said lid has a layer of metallic material, said system comprising:

a single turn electrical coil having upper and lower surfaces lying in substantially parallel planes and having a first end and a second end, with said first end overlapping said second end to define a coil length in excess of 360° and to extend said coil over at least 360° of a container circumference;

a source of electrical power for selectively supplying an electrical current to first and second output leads;

a first means connecting said first output lead of said source to an extreme end portion of said first end of said single turn coil;

a second means connecting said second output lead of said source to an extreme end portion of said second end of said single turn coil; and means for positioning said coil adjacent to a lid mounted on a container, the distance between said lid and said coil extreme end portion at said first connecting means being substantially equal to the distance between said lid and said coil extreme end portion at said second connecting means, with said overlapping first and second ends of said coil disposed with respect to each other, respectively, radially outwardly and radially inwardly of said coil to form a single complete ring of substantially uniform radial thickness having said substantially equal to coil-lid extreme end portion distances, said substantially equal coil-lid extreme end portion distances and said electrical current in said coil inducing a substantially uniform loop of electric current in said lid layer of metallic material to develop a loop of substantially uniform heat in said lid for uniformly sealing said lid to said container.

2. An induction heating system as defined in claim 1 including insulating means mounted between said overlapping ends of said first and second ends of said coil.

3. An induction heating system as defined in claim 1 wherein said ring includes an annular smooth edge and means for pressing said smooth edge against said lid to uniformly secure said lid against said container.

4. An induction heating system as defined in claim 1 including means for pressing an entire annular length of said ring against said lid to uniformly secure said lid against said container.

5. An induction heating system as defined in claim 1 wherein said positioning means includes means for mounting said ring immediately above said lid and means for pressing said ring downward against said lid to secure said lid against said container as said lid is heated.

6. An induction heating system as defined in claim 1 wherein said reduced thickness first radially outward overlapping end and said second radially inward overlapping end are respectively tapered from said full ring radial thickness to each said respective extreme end portion thereof.

7. An induction heating system as defined in claim 1 wherein said reduced thickness first radially outward overlapping end and said second radially inward overlapping end are respectively stepped from said full ring radial thickness to each said respective extreme end portion thereof.

* * * * *